United States Patent
Wey et al.

(10) Patent No.: US 8,295,629 B2
(45) Date of Patent: Oct. 23, 2012

(54) METHOD AND SYSTEM FOR PROCESSING LOW-ILLUMINANCE IMAGE

(75) Inventors: Ho-Cheon Wey, Seongnam-si (KR); Hyun-Hwa Oh, Yongin-si (KR); Young-Jin Yoo, Hwaseong-si (KR); Seong-Deok Lee, Suwon-si (KR)

(73) Assignees: Samsung Electronics Co., Ltd, Suwon-Si (KR); Samsung Electro-Mechanics Co., Ltd., Suwon-Si (KR)

( * ) Notice: Subject to any disclaimer, the term of this patent is extended or adjusted under 35 U.S.C. 154(b) by 963 days.

(21) Appl. No.: 12/318,655

(22) Filed: Jan. 5, 2009

(65) Prior Publication Data
US 2009/0180704 A1     Jul. 16, 2009

(30) Foreign Application Priority Data
Jan. 15, 2008   (KR) .................. 10-2008-0004481

(51) Int. Cl.
*G06K 9/40* (2006.01)
*H04N 5/235* (2006.01)

(52) U.S. Cl. .............. 382/254; 348/229.1; 348/362

(58) Field of Classification Search ............. 382/254; 348/229.1, 362
See application file for complete search history.

(56) References Cited

U.S. PATENT DOCUMENTS

| | | | | |
|---|---|---|---|---|
| 5,576,772 A | * | 11/1996 | Kondo | 348/699 |
| 6,075,902 A | * | 6/2000 | Kojima | 382/260 |
| 6,285,711 B1 | * | 9/2001 | Ratakonda et al. | 375/240.16 |
| 6,324,309 B1 | * | 11/2001 | Tokuyama et al. | 382/300 |
| 8,018,999 B2 | * | 9/2011 | Yao et al. | 375/240.16 |
| 2004/0136603 A1 | * | 7/2004 | Vitsnudel et al. | 382/254 |
| 2006/0017837 A1 | * | 1/2006 | Sorek et al. | 348/362 |
| 2006/0023099 A1 | * | 2/2006 | Vitsnudel et al. | 348/312 |
| 2006/0170790 A1 | * | 8/2006 | Turley et al. | 348/229.1 |
| 2007/0071342 A1 | * | 3/2007 | Bilbrey et al. | 382/254 |
| 2008/0240607 A1 | * | 10/2008 | Sun et al. | 382/275 |
| 2008/0253758 A1 | * | 10/2008 | Yap et al. | 396/234 |
| 2009/0074318 A1 | * | 3/2009 | Yoo et al. | 382/260 |

FOREIGN PATENT DOCUMENTS

| | | |
|---|---|---|
| JP | 2002-290707 | 10/2002 |
| JP | 2002-319015 | 10/2002 |
| KR | 10-2005-0022748 | 3/2005 |
| KR | 10-2007-0064840 | 6/2007 |

OTHER PUBLICATIONS

Ce Liu et al., "Noise Estimation from a Single Image", IEEE Conference on Computer Vision and Pattern Recognition, 2006, 8 pages.
Dong-Hyuk Shin et al., "Block-based Noise Estimation Using Adaptive Gaussian Filtering", 2005 IEEE, 1 page.

* cited by examiner

*Primary Examiner* — Wenpeng Chen
(74) *Attorney, Agent, or Firm* — Staas & Halsey LLP (57) ABSTRACT

Provided are a method and system for processing a low-illuminance image. The system includes an image acquisition unit to acquire two images having different levels of illuminance and sensitivity as first and second images; a motion vector estimation unit to extract a motion vector of the second image based on the first image; an image correction unit to correct the second image using the extracted motion vector; a synthesis coefficient calculation unit to calculate a synthesis coefficient used to synthesize the first image and the corrected second image; and an image synthesis unit to synthesize the first image and the corrected second image using the calculated synthesis coefficient.

20 Claims, 6 Drawing Sheets

FIG. 6

METHOD AND SYSTEM FOR PROCESSING LOW-ILLUMINANCE IMAGE

CROSS-REFERENCE TO RELATED APPLICATIONS

This application claims priority benefit from Korean Patent Application No. 10-2008-0004481 filed on Jan. 15, 2008, in the Korean Intellectual Property Office, the disclosure of which is incorporated herein by reference in its entirety.

BACKGROUND

1. Field

Embodiments relate to a method and system for processing a low-illuminance image, and more particularly, to a method and system for acquiring and processing two images having different characteristics.

2. Description of the Related Art

Motion information of images is required by vision and image processing systems. In addition, image alignment or registration is to geometrically match physically similar regions of two or more images by using motion information.

Motion information may be used to align images, which are captured by a single image sensor using multiple exposures, in order generate a high dynamic range (HDR) image and to align images captured by a digital motion stabilizer, which corrects image blurring caused by handshakes of a user, images captured by a video encoder which requires the compression of image information, and images captured by a medical device. For example, motion information may be used to synthesize a conventional camera image with an infrared image or synthesize a computer tomography (CT) image with a magnetic resonance imaging (MRI) image.

When an object is captured using an image capturing device under the dark or low-lighting condition, the shutter speed of the image capturing device may be reduced to enhance the visibility of the object. However, the reduced shutter speed may result in the shaking of the image capturing device, which, in turn, causes motion blur in an image of the object.

Therefore, a method and system for removing motion blur from an image of an object, which is captured under the low-lighting condition, and increasing the clearness of the contours of the object are required.

SUMMARY

Embodiments provide a method and system for processing images captured under the low-lighting condition and acquiring a high-quality image.

Embodiments provide a method and system for reducing noise from a high-sensitivity image captured under the low-lighting condition and acquiring a high-quality image after an image synthesis process.

Embodiments provide a method and system for synthesizing and thus processing two images having different levels of illuminance and sensitivity by using motion estimation and a synthesis coefficient.

According to an aspect of embodiments, there is provided a system for processing a low-illuminance image. The system includes an image acquisition unit to acquire two images having different levels of illuminance and sensitivity as first and second images; a motion vector estimation unit to estimate a motion vector of the second image based on the first image; an image correction unit to correct the second image using the estimated motion vector; a synthesis coefficient calculation unit to calculate a synthesis coefficient used to synthesize the first image and the corrected second image; and an image synthesis unit to synthesize the first image and the corrected second image using the calculated synthesis coefficient.

According to another aspect of embodiments, there is provided a method of processing a low-illuminance image. The method includes acquiring two images having different levels of illuminance and sensitivity as first and second images; estimating a motion vector of the second image based on the first image; correcting the second image using the estimated motion vector; calculating a synthesis coefficient used to synthesize the first image and the corrected second image; and synthesizing the first image and the corrected second image using the calculated synthesis coefficient.

According to another aspect of embodiments, there is provided a method of processing a low-illuminance image. The method includes acquiring two images having different levels of illuminance and sensitivity as first and second images; converting the first and second images into a first binary image and a second binary image, respectively; generating a combined binary image by combining the first and second binary images using an OR operation; continuously converting a binary number by having a slope at the border of an activated region of the combined binary image; and synthesizing the first and second images using the continuously converted binary number of the combined binary image.

BRIEF DESCRIPTION OF THE DRAWINGS

These and/or other aspects and advantages will become apparent and more readily appreciated from the following description of exemplary embodiments, taken in conjunction with the accompanying drawings of which.

DETAILED DESCRIPTION

Reference will now be made in detail to exemplary embodiments, examples of which are illustrated in the accompanying drawings, wherein like reference numerals refer to the like elements throughout. Exemplary embodiments are described below by referring to the figures.

Hereinafter, exemplary embodiments will be described with reference to block diagrams or flowchart illustrations. It will be understood that each block of the flowchart illustrations, and combinations of blocks in the flowchart illustrations, may be implemented by computer program instructions. These computer program instructions may be provided to a processor of a general purpose computer, special purpose computer, one or more processors in a distributed network, or other programmable data processing apparatus, such that the instructions, which execute via one or more processors, the processor of the computer or other programmable data processing apparatus, implement the functions specified in the flowchart block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture to implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Hereinafter, an exemplary embodiment will be described in detail with reference to the accompanying drawings.

Figure 1:
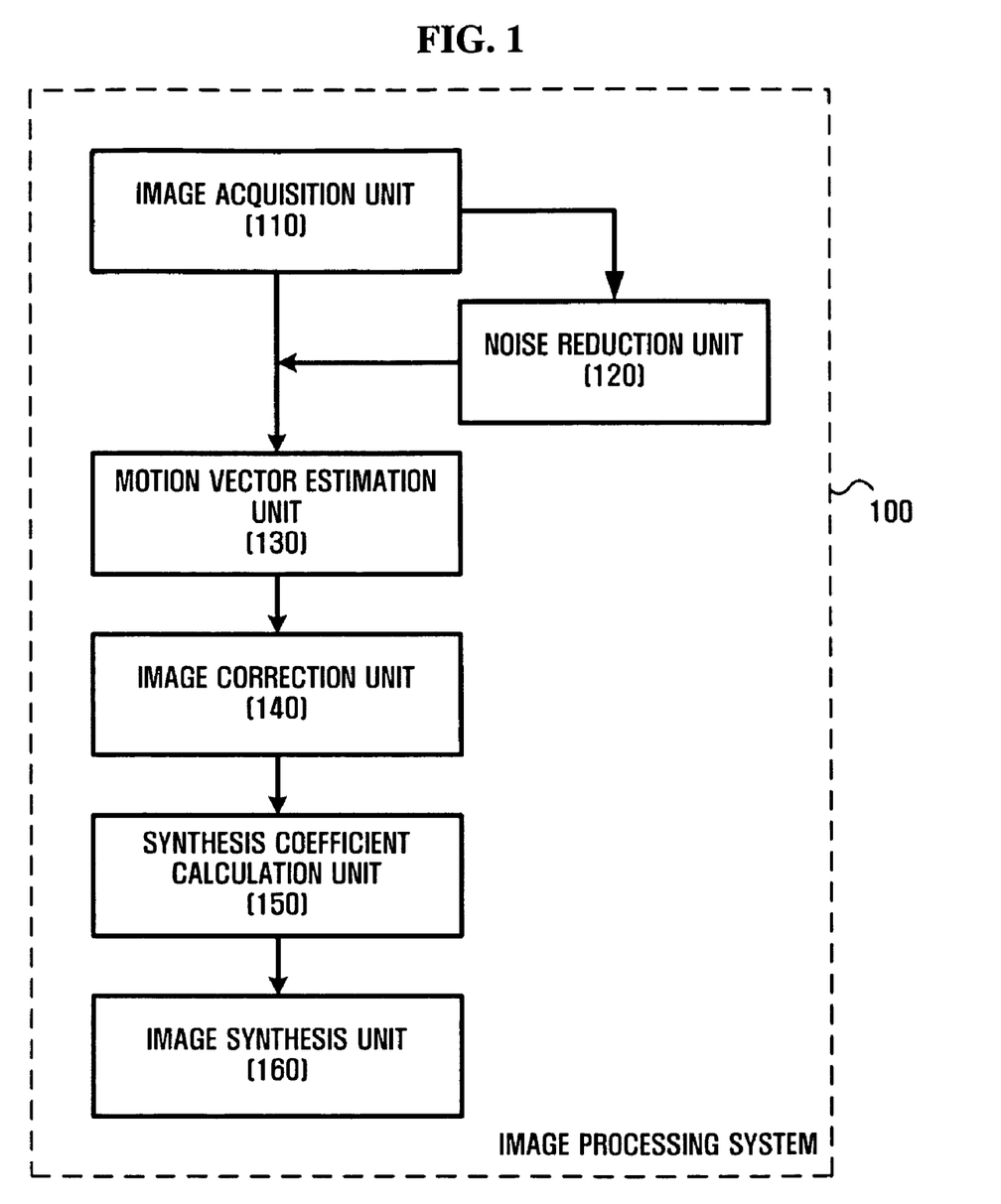
FIG. 1 is a block diagram of a system for processing a low-illuminance image according to an exemplary embodiment.
Figure 2:
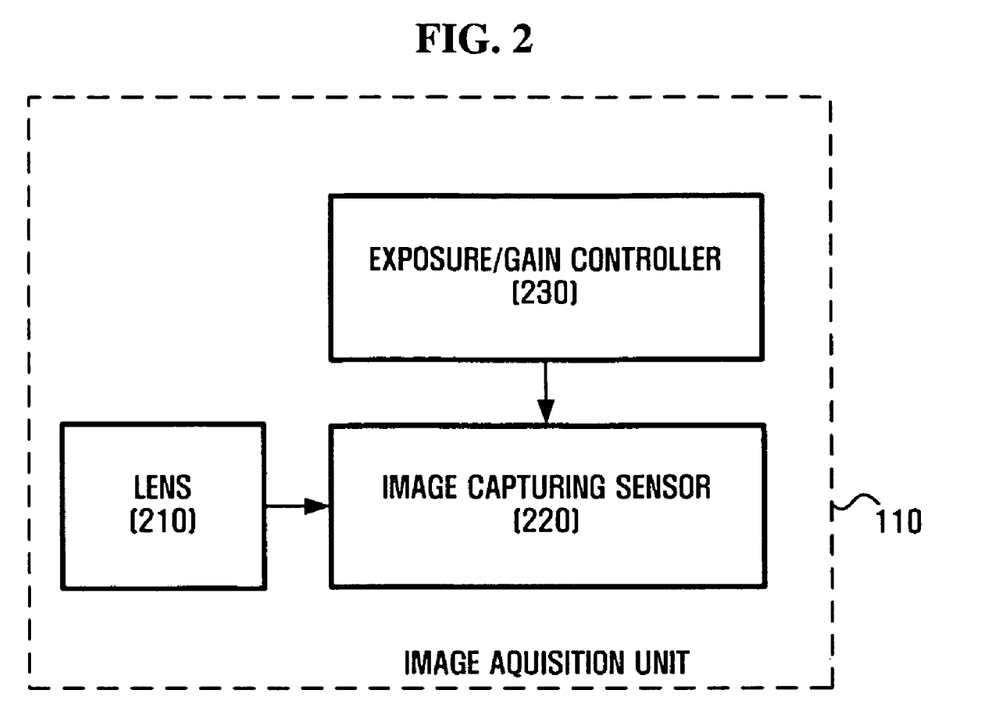
FIG. 2 is a block diagram of an image acquisition unit included in the system of FIG. 1.

FIG. 1 is a block diagram of a system 100 for processing a low-illuminance image according to an exemplary embodiment. FIG. 2 is a block diagram of an image acquisition unit 110 included in the system 100 of FIG. 1.

Referring to FIG. 1, the system 100 includes the image acquisition unit 110, a noise reduction unit 120, a motion vector estimation unit 130, an image correction unit 140, a synthesis coefficient calculation unit 150, and an image synthesis unit 160.

The image acquisition unit 110 may acquire two captured images as first and second images. For example, when a user captures the first image using an image capturing device, the image acquisition unit 110 may automatically capture the second image which has different levels of illuminance and sensitivity from those of the first image.

In the present embodiment, the first image and the second image have different characteristics, i.e., different levels of illuminance and sensitivity. Illuminance is the intensity of light on a given surface, which is represented by the amount of luminous flux incident on the surface, and is measured in lux (lx) or phot (ph). Generally, illuminance is a basis for determining brightness. Sensitivity is sensitiveness to an external stimulus or action and may be represented by a minimum input value which may obtain a predetermined effective power value. As the minimum input value is reduced, the probability of obtaining an effective power value increases, which, in turn, increases sensitivity.

The second image, which is captured in a state where the exposure time and sensitivity of the first image have already determined, may have lower illuminance and higher sensitivity than the first image. When capturing the second image, the image acquisition unit 110 may automatically adjust the illuminance and sensitivity of the second image using the following Equation (1)

$$Ex_2 = Ex_1/k$$

$$Ga_2 = k \times Ga_2 \tag{1}$$

where Ex is an exposure time used to adjust illuminance, and Ga is a gain value used to adjust sensitivity. Lower scripts 1 and 2 indicate the first and second images, respectively. In addition, k indicates a coefficient used to adjust a ratio of illuminance and sensitivity of the second image to those of the first image and has a value greater than 1. While the first and second images are called first and second images in the present embodiment, they may be called in various names. For example, the first and second images may be called the other way around.

Referring to Equation (1), the exposure time of the second image is set k times shorter than that of the first image, and the gain value of the second image is set k times higher than that of the first image. Therefore, the illuminance of the second image is lower than that of the first image while the sensitivity of the second image is higher than that of the first image.

Since the first image has a longer exposure time than the second image, it has relatively higher illuminance. Thus, the color of a space region in the first image may be naturally expressed. On the other hand, since the second image has relatively higher sensitivity than the first image, an edge region in the second image may be clearly expressed. However, due to its higher sensitivity, the second image may have greater noise than the first image.

In the present embodiment, the first and second images having different characteristics, that is, different levels of illuminance and sensitivity, may be synthesized into a single image which combines merits of the first and second images. Specifically, motion blur may be removed from the first and second images using a synthesis coefficient, based on which different weights are assigned to the first and second images, to generate a clear output image.

Referring to FIG. 2, the image acquisition unit 110 may include a lens 210, an image capturing sensor 220, and an exposure/gain controller 230. The lens 210 receives light from an external source, reduces an image formed by the received light, and transmits the reduced image to the image capturing sensor 220.

The image capturing sensor 220 receives first and second images from an external source via the lens 210. The exposure time and gain of each of the first and second images may be predetermined by the exposure/gain controller 230. Alternatively, the exposure time and gain of the first image may be predetermined by a user, and those of the second image may be automatically determined by the exposure/gain controller 230.

The image capturing sensor 220 is an image pickup device which converts light reflected off a subject into an electrical image signal and thus generates an image. The image capturing sensor 220 may largely be classified into a charge coupled device (CCD) image sensor and a complementary metal oxide semiconductor (CMOS) image sensor according to the manufacturing process and application method.

In the present embodiment, there is no limit to captured images. For example, images may be captured by a conventional camera, an infrared camera, a computerized tomography (CT) scanner or a magnetic resonance imaging (MRI) scanner and may be applied as the first and second images.

Referring back to FIG. 1, the noise reduction unit 120 extracts and thus reduces noise from an input image. For example, the noise reduction unit 120 may reduce noise from the input image based on discrete cosine transform (DCT) and wavelet transform domain.

Alternatively, the noise reduction unit 120 may generate a binary image based on a noise level of the input image and filter the generated binary image to acquire an image in which the clearness of an edge region of an object has been increased while noise has been reduced from a space region of the object or the background. The noise reduction unit 120 will be described in detail later.

The motion vector estimation unit 130 estimates a motion vector based on the first and second images. Since the first and second images having different characteristics are sequentially captured, a motion vector, which represents the motion of an object from any one of the first and second images to the other one, needs to be calculated. The calculation of the motion vector is required because a motion made by the image acquisition unit 110 or an object between when the first image is captured and when the second image is captured causes a spatial difference. A motion vector represents the motion information of a block or feature from any one of the first and second images to the other one. Therefore, if the first and second images are synthesized using a motion vector, an image without motion blur caused by handshakes or motions may be acquired.

The motion vector estimation unit 130 may use a conventional method of estimating a motion vector. For example, the motion vector estimation unit 130 may estimate a motion vector by using a full-search method or by searching a variable region based on the correlation between the first and second images.

Alternatively, the motion vector estimation unit 130 may create an image pyramid for each of the first and second images by subsampling, in which the length and width of each of the first and second images are reduced to a half of its original length and width, and calculate optimal motions between the first and second images from highest to lowest levels of the image pyramids. In order to calculate the motion between the first and second images at a specified level of the image pyramids, a luminance-based measure, such as sum of absolute differences (SAD) or mean square error (MSE), or a probability-based measure, such as mutual information or normalized mutual information, may be used. The motion vectors between the first and second images at all levels of the image pyramids may be added to calculate a global motion vector for the entire image.

Alternatively, the motion vector estimation unit 130 may estimate a motion vector using one-dimensional (1D) projection data of the first and second images. Specifically, the motion vector estimation unit 130 may generate projection data into which pixel information of a horizontal or vertical axis of each of the first and second images is integrated and obtain a motion vector component, which maximizes a similarity measure, by moving the generated projection data. When there is a large difference in the illuminance of the first and second images, the projection data of the second image, which has lower illuminance than the first image, may be compensated for the illuminance difference by using a mapping table.

The image correction unit 140 corrects the first or second image using an estimated motion vector. Specifically, the image correction unit 140 may correct the first or second image by moving one of the first and second images by the size and in the direction of an estimated motion vector with respect to the other one of the first and second images.

The synthesis coefficient calculation unit 150 calculates a synthesis coefficient to synthesize the first and second images. The synthesis coefficient is used to synthesize the first and second images. The synthesis coefficient is a weight coefficient and has a value of zero to one.

For example, when a synthesis coefficient for a pixel located at coordinates (i, j) of the first and second images is W(i, j), red (R), green (G) and blue (B) pixels located at the coordinates (i, j) may be given by the following Equation (2)

$$R(i,j)=W(i,j)\times R_2(i,j)+(1-W(i,j))\times R_1(i,j)$$

$$G(i,j)=W(i,j)\times G_2(i,j)+(1-W(i,j))\times G_1(i,j)$$

$$B(i,j)=W(i,j)\times B_2(i,j)+(1-W(i,j))\times B_1(i,j) \quad (2)$$

where R, G and B indicate values of red, green and blue channels of an image, and lower scripts 1 and 2 indicate the first and second images, respectively. When the synthesis coefficient W(i, j) is 1, only the second image is used. When the synthesis coefficient W(i, j) is 0, only the first image is used. That is, when the synthesis coefficient W(i, j) is less than 0.5, a greater weight is assigned to the second image. When the synthesis coefficient W(i, j) is greater than 0.5, a greater weight is assigned to the first image.

The image synthesis unit 160 synthesizes the first and second images into a single output image by using a synthesis coefficient calculated by the synthesis coefficient calculation unit 150. Specifically, the image synthesis unit 160 may synthesize the first and second images into a single output image by assigning different weights to the first and second images based on a synthesis coefficient of Equation (2).

As described above, the system 100 according to the present embodiment may acquire, from two different images, a single output image, which has a clear edge region and from which motion blur has been removed, by using a motion vector and a synthesis coefficient. Since the system 100 captures a long-exposure image and a short-exposure image under the low-lighting condition and combines the long-exposure image and the short-exposure image using a synthesis coefficient, it may acquire an output image with clear grayscale and edge representation. Furthermore, since the system 100 reduces noise from a high-sensitivity image, it may acquire an output image which has a clear edge region and from which noise has been relatively reduced.

Figure 3:
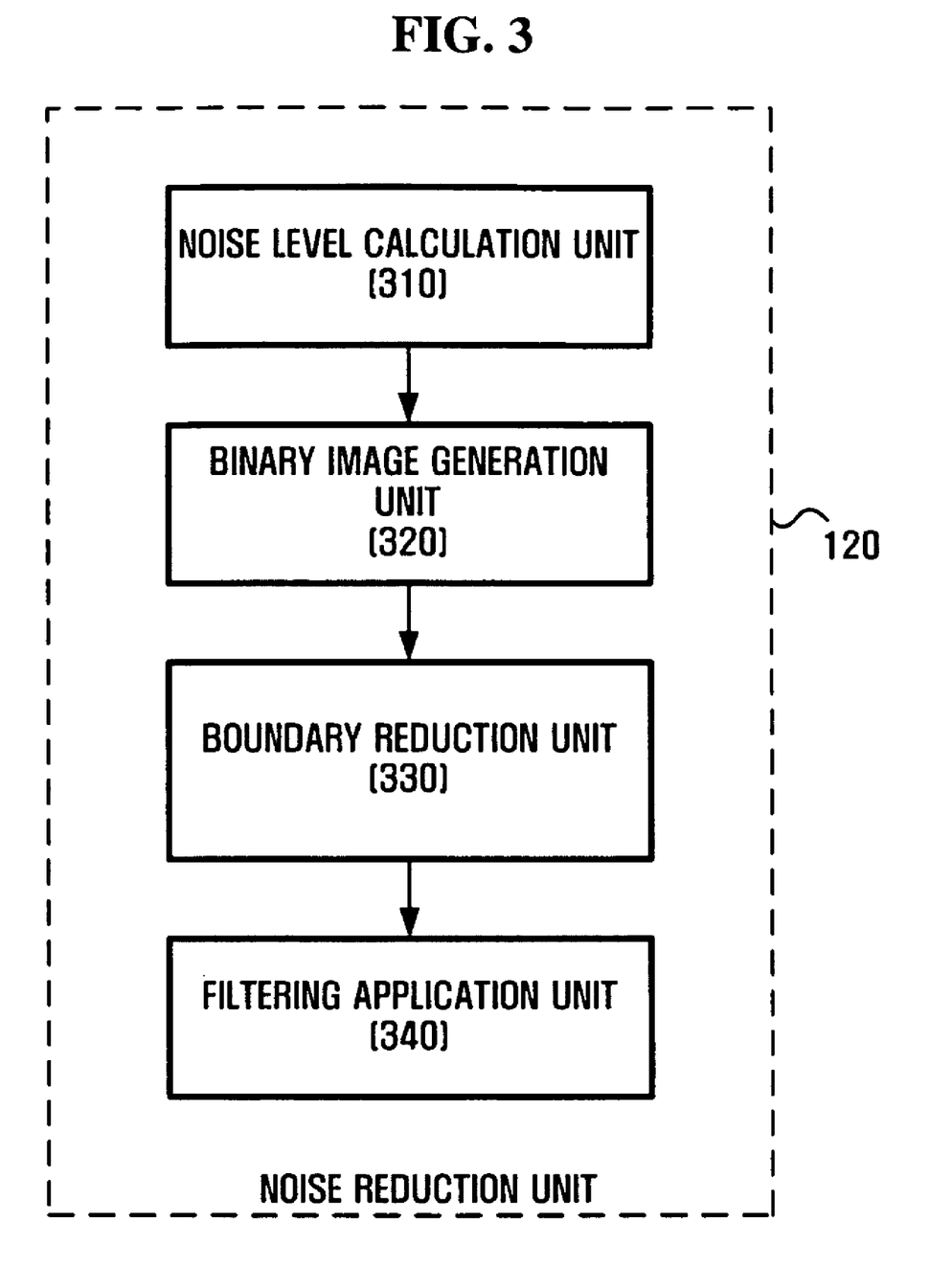
FIG. 3 is a block diagram of a noise reduction unit included in the system of FIG. 1.

FIG. 3 is a block diagram of the noise reduction unit 120 included in the system 100 of FIG. 1.

Referring to FIG. 3, the noise reduction unit 120 reduces noise from the input first or second image. The second image is captured using a shorter exposure time than the exposure time for the first image. In addition, the sensitivity of the second image is set higher than that of the first image. Thus, the noise reduction unit 120 may receive the second image as an input image and reduce noise from the second image.

The noise reduction unit 120 may include a noise level calculation unit 310, a binary image generation unit 320, a boundary reduction unit 330, and a filtering application unit 340.

The noise level calculation unit 310 calculates the noise level of an input image. The noise level is a numerical representation of the size of noise that exists in an input image. Generally, noise of an image sensor has signal dependent noise characteristics which vary according to a photographing environment and properties of the image sensor. A lot of methods of estimating a noise level based on the signal dependent noise characteristics have been introduced. An example of the methods is disclosed in "Block-Based Noise Estimation Using Adaptive Gaussian Filtering," D. H. Shin et al., Institute of Electrical and Electronics Engineers (IEEE) Transactions on Consumer Electronics, Vol. 51, No. 1, February 2005. In addition, another example is disclosed in "Noise Estimation from a Single Image," C. Liu et al., Proceedings of the 2006 IEEE Computer Society Conference on Computer Vision and Pattern Recognition (CVPR) 2006. The above two methods are mere examples, and various method of estimating a noise level may be used in exemplary embodiments.

The binary image generating unit 320 calculates a signal-to-noise ratio (SNR) value of each pixel in the input image by using the calculated noise level. Then, the binary image generating unit 320 compares the calculated SNR value of each pixel with an arbitrarily predetermined noise threshold value to generate a binary image. For example, if the SNR value of a specified pixel is greater than the predetermined noise threshold value, the specified pixel may be set to one. If the SNR value of the specified pixel is less than the predetermined noise threshold value, the specified pixel may be set to zero. If a specified pixel of an image is set to one, it contains important information for the image. In this case, important information may refer to an edge region of the image. The SNR value of a specified pixel may be calculated using a statistic amount of data values in a local region around the specified pixel. Here, standard deviation (STD), mean of absolute differences (MAD), or SAD may be used.

The boundary reduction unit 330 smoothes the boundary between an activated region and a deactivated region in a binary image. Each pixel of the binary image has a binary data value of zero or one. Since the binary image is divided into the activate region (including pixels which have a binary data value of one) and the deactivated region (including pixels which have a binary data value of zero), there may be a sudden change in pixel value at the boundary between the activated region and the deactivated region in the binary image. Consequently, an unnatural image may be generated. Thus, the binary image needs to be processed in order to reduce the boundary effect. That is, the binary image needs to be processed so that its pixels may have values of not only zero or one but also values between zero and one. As a method of reducing the boundary effect, Gaussian blur may be used.

The filtering application unit 340 filters each pixel of the binary image with the reduced boundary effect by assigning a different weight to each pixel. For example, if a binary data value of a specified pixel of the binary image is close to zero, a large noise filter kernel may be applied to the specified pixel. Thus, the filtering application unit 340 may correct image information of the specified pixel by assigning high weights to pixels around the specified pixel and thus reduce noise from the binary image. On the contrary, if the binary data value of the specified pixel of the binary image is close to one, a small noise filter kernel may be applied to the specified pixel. If the binary value of the specified pixel is close to one, the specified pixel may correspond to an edge region of the binary image. Thus, the filtering application unit 340 may correct the image information of the specified pixel by assigning low weights to the pixels around the specified pixel. Consequently, the clearness of the edge region may be maintained although the image information of the specified pixel is hardly changed.

The results of applying the two filters that have different weights are combined to generate an image with reduced edge region artifacts. If a weight of $g(0 \leq g \leq 1)$ is assigned to the large noise filter kernel (L), a weight of $(1-g)$ is assigned to the small noise filter kernel (S). Thus, a final image may be defined by $gL+(1-g)S$. Here, as the activation of an estimated region is increased, a high weight may be assigned to the small noise filter kernel in order to generate an image with enhanced edge region.

Figure 4:
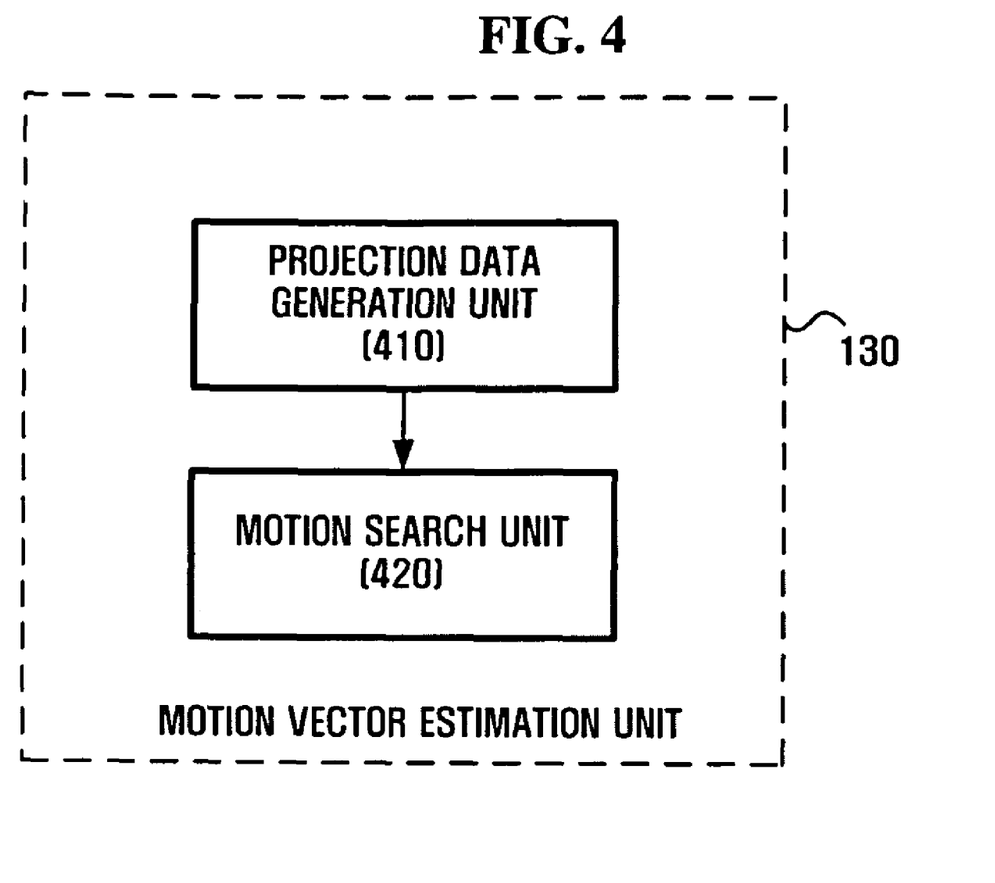
FIG. 4 is a block diagram of a motion vector estimation unit included in the system of FIG. 1.

FIG. 4 is a block diagram of the motion vector estimation unit 130 included in the system 100 of FIG. 1.

A projection data generation unit 410 generates projection data from each of the first and second images by using a mapping table. Specifically, the projection data generation unit 410 generates first projection data of the two-dimensional (2D) first image and second projection data of the 2D second image. Each of the first projection data and the second projection data refers to 1D distribution data represented by a representative value of a horizontal or vertical axis of each of the 2D first and second images. In addition, the 1D distribution data may refer to a mean value of pixels on the horizontal or vertical axis of the 2D first or second image or a representative value calculated in consideration of the brightness of the second image with respect to the first image.

A motion search unit 420 estimates a motion vector using the generated first and second projection data. The motion search unit 420 may estimate a motion vector by maximizing a similarity measure of the first projection data and the second projection data. Here, various methods may be used to calculate a similarity measure.

For example, a conventional luminance-based method or a conventional probability-based method may be used. Examples of the conventional luminance-based method may include correlation, normalized correlation, and SAD algorithms. In addition, examples of the probability-based method may include mutual information and normalized mutual information algorithms. Since the above algorithms are well known, a detailed description thereof will be omitted in the present specification.

As described above, in the present embodiment, projection data having 1D distribution is generated from a 2D image, and a motion vector is estimated based on the obtained projection data. Thus, the complexity of estimating a motion vector may be reduced. In addition, the second image is moved using the estimated motion vector to correct the motion between the first and second images. Alternatively, the first image may be moved with respect to the second image to correct the motion between the first and second images.

Figure 5:
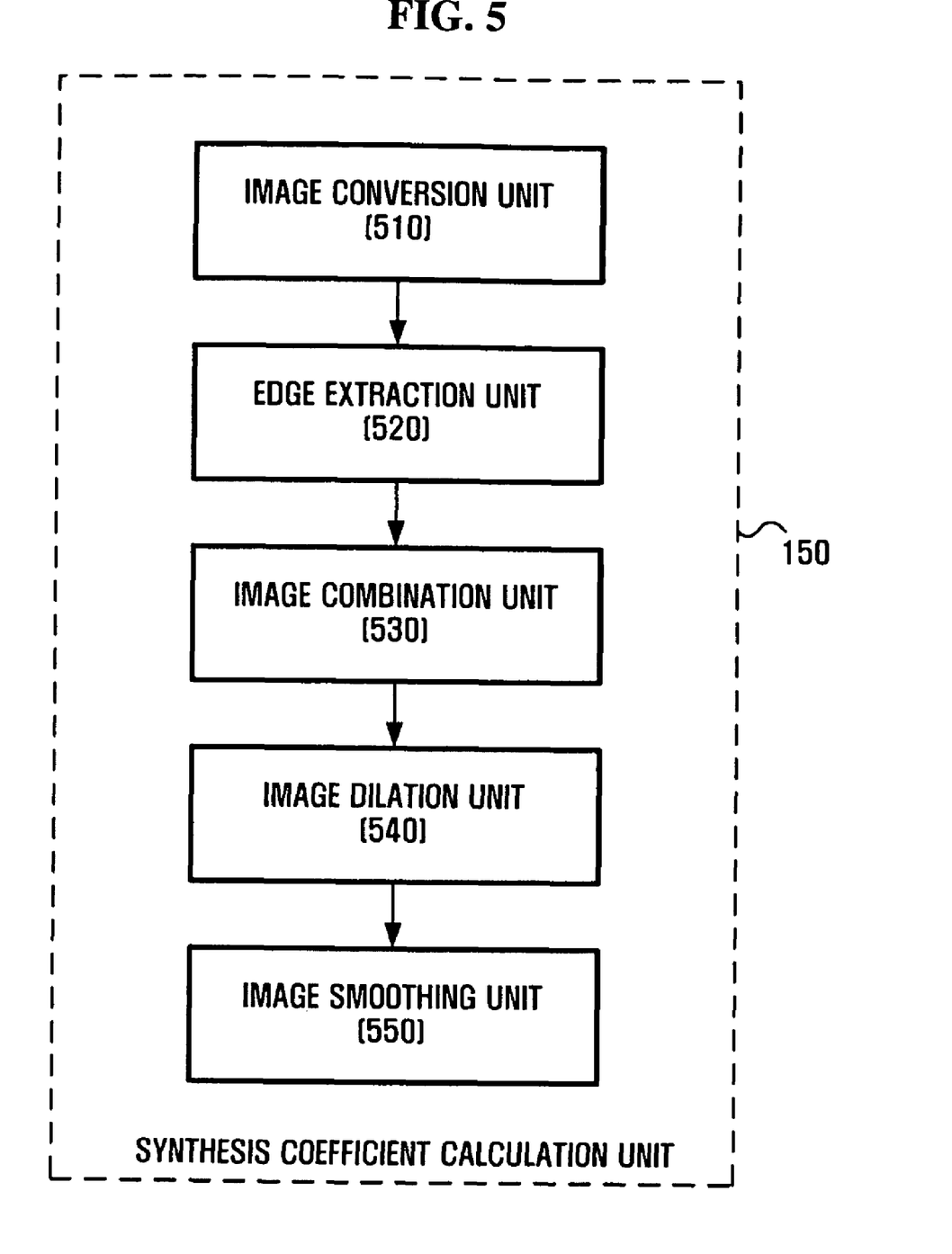
FIG. 5 is a block diagram of a synthesis coefficient calculation unit included in the system of FIG. 1.

FIG. 5 is a block diagram of the synthesis coefficient calculation unit 150 included in the system 100 of FIG. 1.

Referring to FIG. 5, the synthesis coefficient calculation unit 150 calculates a synthesis coefficient based on the first image and the corrected second image. In this case, the corrected second image denotes an image obtained after the second image is motion-compensated using a motion vector.

The synthesis coefficient calculation unit 150 may include an image conversion unit 510, an edge extraction unit 520, an image combination unit 530, an image dilation unit 540, and an image smoothing unit 550.

The image conversion unit 510 may convert RGB channel values of each input image into YCbCr channel values using the following Equation (3)

$$Y = 0.29900R + 0.58700G + 0.11400B$$

$$Cb = -0.16874R - 0.33126G + 0.50000B$$

$$Cr = 0.50000R - 0.41869G - 0.08131B \qquad (3)$$

where Y is luminance, Cb is blue chrominance, and Cr is red chrominance.

If the image conversion unit 510 converts the RGB channel values of each image into the YCbCr channel values, it may acquire three grayscale images for the image. That is, the image conversion unit 510 may acquire a total of six grayscale images.

Converting each image represented by the RGB channel values into an image represented by the YCbCr channel values is merely an example, and exemplary embodiments are not limited thereto. That is, the image conversion unit 510 may also convert each of the first image and the corrected second image represented by the RGB channel values into a grayscale image represented by, for example, a Y channel value. Alternatively, the image conversion unit 510 may not convert the RGB channel values of each input image. Instead, the image conversion unit 510 may acquire three grayscale images by extracting the RGB channel values from each of the first image and the corrected second image and acquire six grayscale images for the first image and the corrected second image.

For the simplicity of description, it will hereinafter be assumed that the image conversion unit 510 converts the first image and the corrected second image of the RGB channels into grayscale images of a Y channel. A grayscale image of the Y channel, which has been converted from the first image, will be referred to as a first Y-channel image, and a grayscale image of the Y channel, which has been converted from the corrected second image, will be referred to as a second Y-channel image.

The edge extraction unit 520 generates a binary image by applying a predetermined threshold value to a Y-channel image and extracts an edge region from the binary image. That is, the edge extraction unit 520 generates a first binary image from the first Y-channel image and a second binary image from the second Y-channel image. Each pixel of a binary image has a value of zero or one. In addition, an activated region including pixels, which have a value of one, may correspond to an edge region.

The predetermined threshold value used by the edge extraction unit 520 may be determined based on a statistical analysis of the SNR value of each of the first image and the corrected second image. When the SNR value of a specified pixel of each of the first image and the corrected second image is greater than the predetermined threshold, the specified pixel may be set to one. When the SNR value of the specified pixel is less than the predetermined threshold value, the specified pixel may be set to zero.

The image combination unit 530 combines the first binary image and the second binary image and generates a combined binary image. If the first binary image and the second binary image are combined into a single binary image by an OR operation, an activated region including pixels, which have a value of one, may be expanded.

The image dilation unit 540 may slightly expand a region recognized as an edge region of the combined binary image. In the combined binary image, the activated region including pixels, which have a value of one, may be the edge region which corresponds to the contours of an object. The image dilation unit 540 may expand the border of the activated region to a deactivated region.

The image smoothing unit 550 reduces a slope at the border of the activated region of the combined binary image. At the border of the activated region of the combined binary image, a pixel value of zero suddenly jumps to one. That is, there is a discontinuity in pixel value at the border of the activated region. Thus, when the combined binary image is reconstructed into a color image, the border of the activated region may be unnatural, and its color may not be well represented. In this regard, the image smoothing unit 550 may reduce the difference between pixel values at the border of the activated region, which includes pixels having a value of one, by applying a smoothing technique. Here, various smoothing techniques, such as Gaussian smoothing, may be used.

Due to the image smoothing unit 550, the combined binary image may have continuous pixel values ranging from zero to one at the border of the activated region thereof, and these continuous pixel values are final synthesis coefficients. Therefore, the synthesis coefficient $W(i, j)$ may be generated for each pixel of the combined binary image and used by the image synthesis unit 160.

Synthesis coefficients are zero in a non-edge region of the binary image and one at the center of the activated region which is the edge region. Therefore, according to Equation (2), an output image is determined by the first image in the non-edge region and by the second image at the center of the activated region which is the edge region.

As described above, the first and second images may be combined using a synthesis coefficient. In addition, since pixel information of a space region of the first image, which was captured using a long exposure time, and that of an edge region of the second image, which was captured using a short exposure time and a high-sensitivity mode, are used, an output image, whose color is excellently represented on the whole and which has a highly clear edge region, may be acquired.

Figure 6:
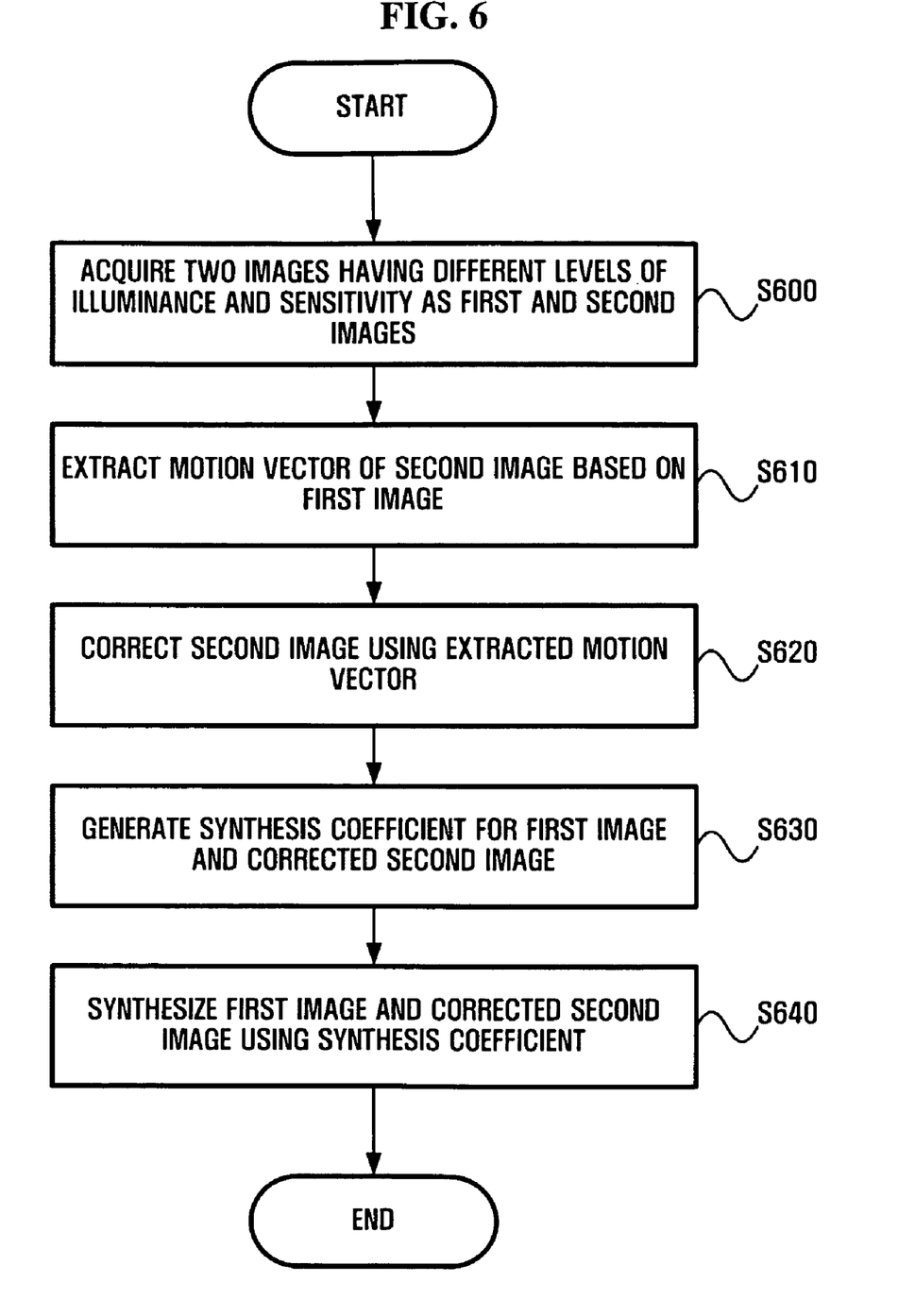
FIG. 6 is a flowchart illustrating a method of processing a low-illuminance image according to an exemplary embodiment.

FIG. 6 is a flowchart illustrating a method of processing a low-illuminance image according to an exemplary embodiment. Referring to FIG. 6, two images having different levels of illuminance and sensitivity are acquired as first and second images (operation S600). As shown in Equation (1), when the first image is captured by an image capturing sensor in a state where the illuminance and sensitivity of the first image are preset, the second image may also be captured by automatically setting different illuminance and sensitivity for the second image. Since the first and second images are captured using different levels of illuminance and sensitivity, an image, into which the captured first and second images are synthesized, combines merits of the first and second images.

In addition, since the sensitivity of the second image is high, a process of reducing noise from the second image may additionally be performed. In order to reduce noise from the second image, the second image may be converted into a binary image. Then, a different noise filter kernel may be applied to each region of the binary image. As a result, noise may be reduced from regions that require noise reduction.

Once the first and second images are acquired, a motion vector of one of the first and second images is estimated based on the other one of the first and second images (operation S610). Here, the motion vector may be estimated using a conventional method. Alternatively, an image pyramid may be created, and a motion vector between the first and second images at each level of the image pyramid may be estimated. Alternatively, a method of estimating a motion vector based on projection data may be used.

When the motion vector is extracted, one of the first and second images is corrected using the extracted motion vector (operation S620). Image correction using a motion vector refers to correcting the spatial difference between two images which are sequentially arranged in time.

After the image correction process, a synthesis coefficient used to synthesize the first and second images is calculated (operation S630). For example, the first and second images are converted into single-channel images, respectively. Alternatively, each of the first and second images may be converted into a plurality of images of a single channel. Then, a predetermined threshold value is applied to the single-channel images to generate a binary image for each of the first and second images. Next, the two binary images are combined by the OR operation to generate a combined binary image. Here, a process of expanding the border of an activated region, which corresponds to an edge region, in the combined binary image may additionally be performed. Then, a slope at the border of the activated region in the combined binary image may be smoothed. After the slope is smoothed, the combined binary image may have continuous pixel values at the border between the activated region and a deactivated region. These continuous pixel values correspond to synthesis coefficients.

When the synthesis coefficient is calculated, the first and second images are synthesized (operation S640). In this case, the first or second image may have been corrected using the motion vector. The synthesis coefficient is a value indicating weights. Thus, based on the synthesis coefficient, a different weight is assigned to each pixel of the first and second images to acquire an output image.

As described above, according to exemplary embodiments, two images captured under the low-lighting condition are processed to acquire a high-quality image. In addition, since noise is reduced from a high-sensitivity image captured under the low-lighting condition, a high-quality image may be acquired after an image synthesis process.

Furthermore, the two images having different levels of illuminance and sensitivity are synthesized using motion estimation and a synthesis coefficient. Therefore, a high-quality image, which does not have motion blur caused by handshakes and combines merits of the two images, may be acquired.

Although a few exemplary embodiments have been shown and described, it would be appreciated by those skilled in the art that changes may be made in these exemplary embodiments without departing from the principles and spirit of embodiments, the scope of which is defined in the claims and their equivalents.

What is claimed is:

1. A system for processing a low-illuminance image, the system comprising:
    an image acquisition unit to acquire two images having different levels of illuminance and sensitivity as first and second images;
    a motion vector estimation unit to estimate a motion vector of the second image based on the first image;
    an image correction unit to correct the second image using the estimated motion vector;
    a synthesis coefficient calculation unit to calculate a synthesis coefficient used to synthesize the first image and the corrected second image;
    an image synthesis unit to synthesize the first image and the corrected second image using the calculated synthesis coefficient: and
    a noise reduction unit to reduce noise from the second image by comparing a signal-to-noise ratio (SNR) of each pixel of the second image with a predetermined threshold value.

2. The system of claim 1, wherein the second image acquired by the image acquisition unit has lower illuminance and high sensitivity than the first image.

3. The system of claim 1, wherein the noise reduction unit comprises:
    a noise level calculation unit to calculate a noise level of the second image;
    a binary image generation unit to calculate the signal-to-noise ratio (SNR) of each pixel of the second image and to generate a binary image of the second image based on a threshold value;
    a boundary reduction unit to smooth the boundary between an activated region and a deactivated region in the binary image; and
    a filtering application unit to filter the binary image by applying a noise filter to the binary image.

4. The system of claim 1, wherein the motion vector estimation unit estimates the motion vector by creating an image pyramid for each of the first and second images by subsampling, in which length and width of each of the first and second images are reduced to a half of its original length and width, and calculating an optimal motion between the first and second images at each level of the image pyramids from highest to lowest.

5. The system of claim 1, wherein the motion vector estimation unit generates one-dimensional (1D) projection data of each of the first and second images and estimates a distance, which is traveled by the generated projection data and maximizes a similarity measure, as the motion vector by moving the generated projection data.

6. The system of claim 1, wherein the synthesis coefficient calculation unit comprises:
    an edge extraction unit to convert the first image and the corrected second image into a first binary image and a second binary image, respectively;
    an image combination unit to combine the first binary image and the second binary image using an OR operation and generating a combined binary image; and
    an image smoothing unit to continuously convert a binary region by having a slope at the border of an activated region of the combined binary image.

7. The system of claim 6, wherein the activated region comprises pixels having a binary value of one after the OR operation.

8. The system of claim 6, wherein the synthesis coefficient calculation unit further comprises an image dilation unit expanding the border of the activated region of the combined binary image to a deactivated region.

9. The system of claim 1, wherein the image acquisition unit comprises:
    a lens;
    an image capturing sensor to capture an image received through the lens; and
    an exposure/gain controller to control the exposure and sensitivity of the captured image.

10. A method of processing a low-illuminance image, the method comprising:
    acquiring two images having different levels of illuminance and sensitivity as first and second images;
    extracting a motion vector of the second image based on the first image;
    correcting the second image using the extracted motion vector;
    calculating a synthesis coefficient used to synthesize the first image and the corrected second image;
    synthesizing the first image and the corrected second image using the calculated synthesis coefficient; and
    reducing noise from the second image after acquiring the first and second images by comparing a signal-to-noise (SNR) of each pixel of the second image with a predetermined threshold value,
    wherein the method is performed with at least one processor.

11. The method of claim 10, wherein the acquired second image has lower illuminance and high sensitivity than the first image.

12. The method of claim 10, wherein the reducing of the noise comprises:
    calculating a noise level of the second image;
    calculating the SNR of each pixel of the second image and generating a binary image of the second image based on a threshold value;
    smoothing the boundary between an activated region and a deactivated region in the binary image; and
    filtering the binary image by applying a noise filter to the binary image.

13. The method of claim 10, wherein the extracting of the motion vector comprises estimating the motion vector by creating an image pyramid for each of the first and second images by subsampling, in which length and width of each of the first and second images are reduced to a half of its original length and width, and calculating an optimal motion between the first and second images at each level of the image pyramids from highest to lowest.

14. The method of claim 10, wherein the extracting of the motion vector comprises:
generating 1D projection data of each of the first and second images; and
estimating a distance, which is traveled by the generated projection data and maximizes a similarity measure, as the motion vector by moving the generated projection data.

15. The method of claim 10, wherein the calculating of the synthesis coefficient comprises:
converting the first image and the corrected second image into a first binary image and a second binary image, respectively;
combining the first binary image and the second binary image using an OR operation and generating a combined binary image; and
continuously converting a binary region by having a slope at the border of an activated region of the combined binary image.

16. The method of claim 15, wherein the activated region comprises pixels having a binary value of one after the OR operation.

17. The method of claim 15, wherein the calculating of the synthesis coefficient further comprises expanding the border of the activated region of the combined binary image to a deactivated region.

18. A method of processing a low-illuminance image, the method comprising:
acquiring two images having different levels of illuminance and sensitivity as first and second images;
converting the first and second images into a first binary image and a second binary image, respectively;
generating a combined binary image by combining the first and second binary images using an OR operation;
continuously converting a binary number by having a slope at the border of an activated region of the combined binary image; and
synthesizing the first and second images using the continuously converted binary number of the combined binary image,
wherein in the converting of the first and second images into the first and second binary images, a signal-to-noise (SNR) value of each pixel of each of the first and second images is calculated, and the first and second images are converted into the first and second binary images by setting each pixel to one if the SNR value of the pixel is greater than a predetermined threshold value and setting the pixel to zero if the SNR value of the pixel is less than the predetermined threshold value.

19. The method of claim 18, wherein the activated region comprises pixels having a binary value of one after the OR operation, and the calculating of the synthesis coefficient further comprises expanding the border of the activated region of the combined binary image to a deactivated region.

20. The method of claim 18, further comprising converting the first and second images into single-channel images, respectively, after acquiring the first and second images.

* * * * *

UNITED STATES PATENT AND TRADEMARK OFFICE
CERTIFICATE OF CORRECTION

PATENT NO. : 8,295,629 B2
APPLICATION NO. : 12/318655
DATED : October 23, 2012
INVENTOR(S) : Ho-Cheon Wey et al.

It is certified that error appears in the above-identified patent and that said Letters Patent is hereby corrected as shown below:

In the Claims:

Column 11, Line 42, In Claim 1, delete "coefficient:" and insert -- coefficient; --, therefor.

Signed and Sealed this
Seventh Day of May, 2013

Teresa Stanek Rea
*Acting Director of the United States Patent and Trademark Office*